Nov. 24, 1931.  J. HOLTZMAN  1,833,114
VEHICLE PROPELLING MECHANISM
Filed July 15, 1925

INVENTOR
John Holtzman

Patented Nov. 24, 1931

1,833,114

UNITED STATES PATENT OFFICE

JOHN HOLTZMAN, OF NEW YORK, N. Y.

VEHICLE PROPELLING MECHANISM

Application filed July 15, 1925. Serial No. 43,692.

The principal feature of this invention is to provide means for propelling vehicles of the self-contained type over a slippery or unstable surface, utilizing the power transmitted to the driving wheels of the vehicle to acutate the propelling mechanism.

A further object is in the provision of gliding shoes adapted for attachment to the wheels of common types of self propelled vehicles without material change therein, parts of the subject matter appearing in my Patent #1,538,554, issued May 19, 1925.

Another object is to provide devices for this purpose, essentially practical in their nature, simple to apply and operate, and moderate in cost of construction.

These objects are achieved by the novel design, construction and arrangement of parts hereinafter described and illustrated in the associated drawings, constituting an essential part of this disclosure, and in which:—

Figure 1:
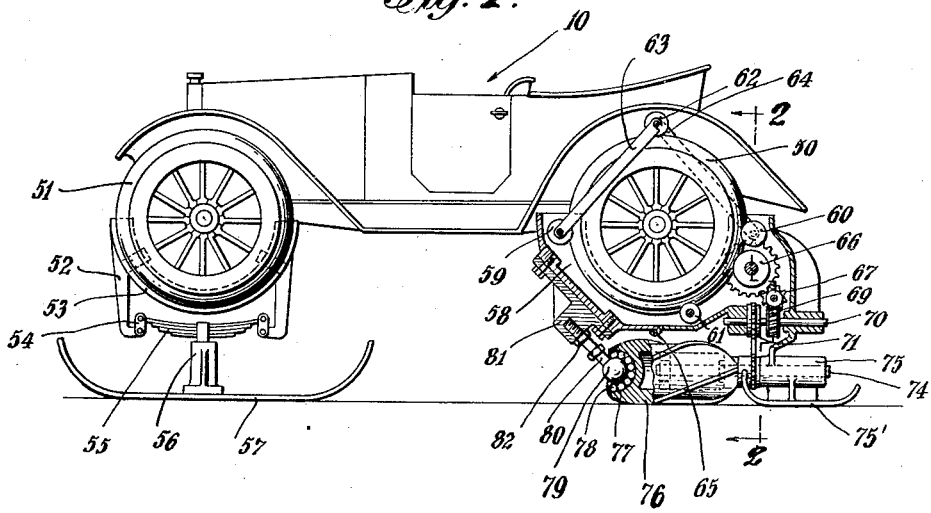
Figure 1 is a partial side elevational, partial sectional view of a modified type of vehicle, illustrating a different mode of transmission, drive device.
Figure 2:
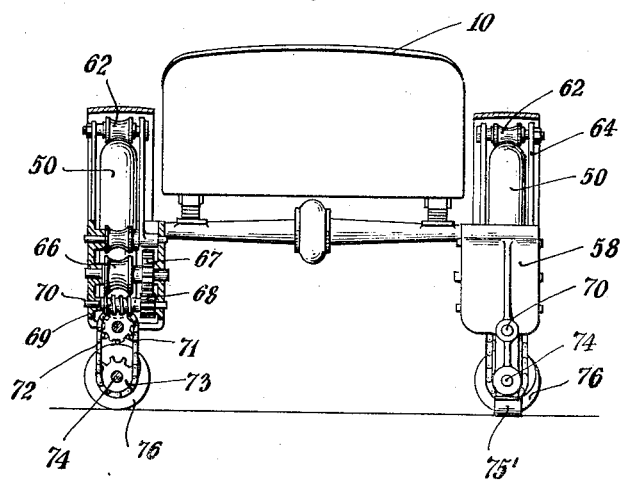
Figure 2 is a partial front elevational, partial sectional view taken on line 2—2 of Figure 1.

Referring to the drawings in detail the numeral 10 designates in general the body of a conventional type of automobile complete with motor and all other appurtenances.

The drawings illustrate a gliding and propelling mechanism as applied to vehicles of the automobile type, having a pair of drive wheels 50 at the rear, and dirigible wheels 51 at the front.

Both pairs of wheels are held raised from the roadway, those at the front resting in pairs of opposed supports 52 connected by a partial band 53 to which the wheels are individually and securely clamped.

The lower ends of the supports are provided with pivoted links 54 between which are extended, semi-elliptical springs 55 their centers being secured to uprights 56 mounted on skid-like, gliding or runner elements 57 at points slightly in advance of their centers.

Thus each of the front wheels are glidingly supported and free to be directed by the steering mechanism of the vehicle in the usual manner.

The resilient tires of the rear wheels 50 rest in a rigid concave frame or casing 58 having support rollers 59 and 60 impinging against the wheel at opposite points, substantially level with the axle the upper edges of the casing extending above the wheel center.

A smaller roller 61 is located below the tire at a point rearward of the center in a vertical plane and a fourth roller 62 is held between opposed links 63 and 64 on the upper surface of the tire, the links being pivoted on the axis of the respective rollers 59 and 60, so that by releasing one of these pivots the casing elements can turn outwardly along the hinge 65 connecting at the bottom. It will be seen and understood that all the several rollers bearing on the tires have concave faces to agree with the curve of the tires.

A drive roller 66, of greater diameter than the others, is journalled in the casing to bear against the tire below.

The roller 60 drives a train of gears 67 and 68, as shown, terminating in the worm wheel 69 on the shaft 70, this shaft being in a horizontal plane and having fixed to it a chain pulley 71 driving a chain belt 72 to communicate rotary motion to another chain pulley 73 fixed on a shaft 74.

The shaft 74 is parallel to the shaft 70 and is rotatably mounted in a bearing 75 raised from the relatively short runner 75'.

The opposite, front end of the shaft 74 enters axially into a propeller 76 having helical blades in such manner as to rotate the same.

The front end of the propeller is formed with a cup shaped cavity 77 adapted to receive a plurality of balls 78 acting as antifriction elements for a sphere 79 formed on the end of a bar 80, screw threaded, for adjustment, at its opposite end into a block 81 bolted to the front position of the casing 58 and is provided with means to receive a wrench for adjustment and a lock nut 82. Obviously this arrangement may be used to regulate the frictional contact of the drive roll 66 against the tire 50.

In operation, the rear wheels being actuated by the motor of the vehicle, rotary motion is transmitted to the propellers 76 so as to rotate them upon their axes 74, causing the vehicle to move either forward or back as desired.

Thus the vehicle will be urged to progress in a forcible and practical manner over unstable surfaces, as snow or mud.

While certain preferred embodiments of this device have been shown and described, it will be understood that changes may be made without departing from the scope of the invention as defined by the appended claims.

Having thus described my invention, what I claim as new and desire to secure by Letters Patent, is:—

1. Propelling means for wheeled vehicles comprising casings into which the drive wheels extend to more than half their diameter, frames supported by said casings extending above the wheels, concave faced rolls journalled in said frames and casings to engage the wheels at opposed points, propellers supported by said casings directly below the wheels, and means driven by frictional contact with said wheels to actuate said propellers.

2. In a propelling mechanism for an automobile having a rear axle provided with resiliently tired wheels, propelling mechanism comprising frames, friction rolls and a gear train driven thereby detachably mounted on the rear wheels, said mechanism being confined on the periphery of the wheels and actuated thereby, and the propellers disposed below the rear wheel tires for transmitting a propulsive effect to the automobile when its motor transmits motion to said rear wheels.

3. In a propelling mechanism for a wheeled vehicle the combination of a body having a rear axle, a pair of wheels for the rear axle, a self-contained power plant to drive the rear wheels, a propelling mechanism comprising a hingedly pointed frame detachably connected to the rear wheels, a worm gear drive supported in the frame, means frictionally driven by said wheels to actuate said gear drive, a propelling element for said mechanism, and a flexible element connecting said worm gear drive and said propelling element.

4. In a propelling mechanism for a wheeled vehicle the combination of a body, front and rear axles for the vehicle, a pair of wheels, each with a yielding periphery for the rear axle, a self-contained power plant to drive the rear wheels, a propelling mechanism detachably connected to the rear end of the vehicle, said mechanism comprising frames circumjacent said rear wheels, a worm gear drive supported in the frames, a movable element supported by the yieldably periphery of the rear wheels and in frictional contact with the same, said element being operatively associated with the gear drive of the propelling mechanism and adjustably threaded means mounted independently of the axes of the wheels to regulate the degree of frictional contact between the movable element and the yieldable periphery of the wheels for transmitting a propulsive effort therefrom to the vehicle.

In testimony whereof I have signed my name to this specification.

JOHN HOLTZMAN.